Oct. 13, 1925. 1,556,654
H. H. WHITE
POWER DELIVERING OR HOISTING WINCH
Filed Nov. 1, 1923 4 Sheets-Sheet 1

Inventor
Henry H. White
By Peirson E. Hodges
his Attorney

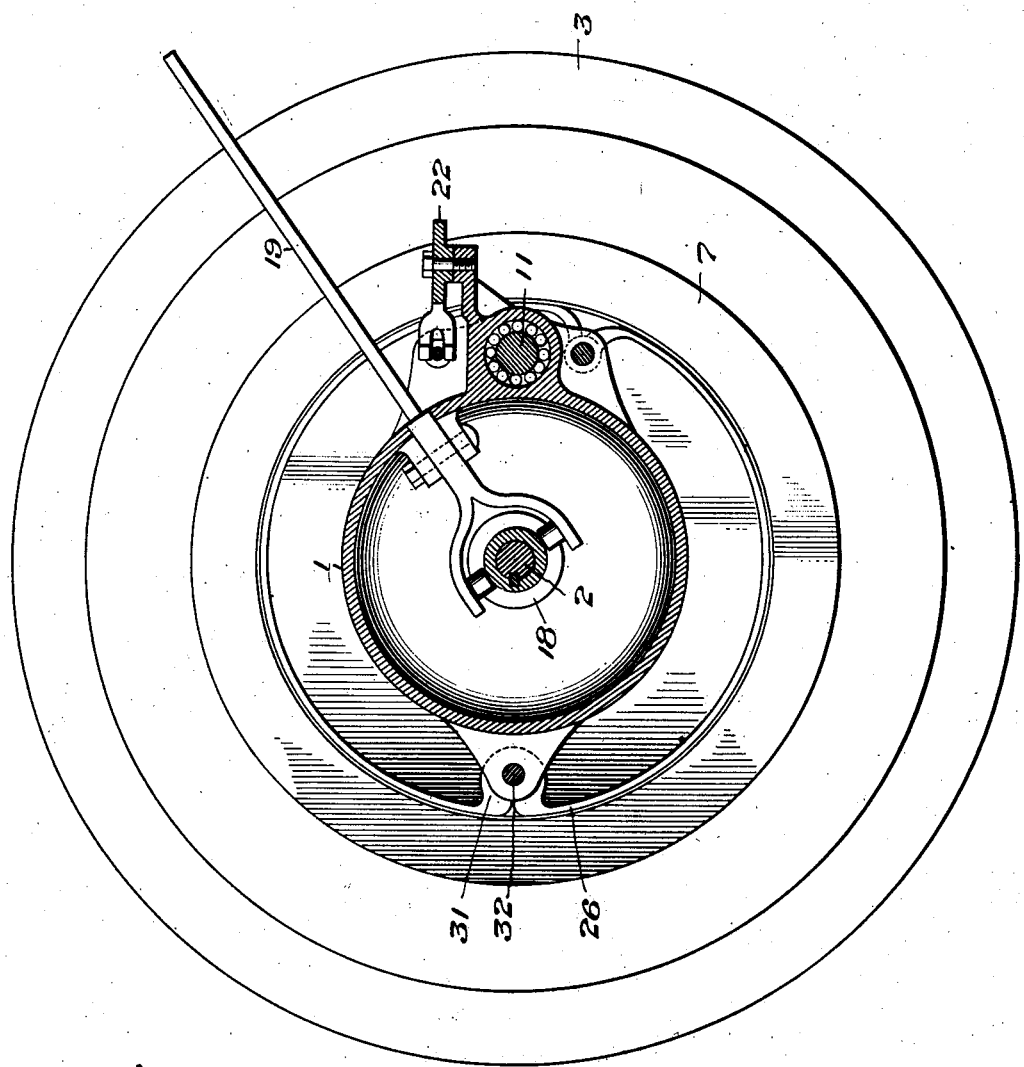

Patented Oct. 13, 1925.

1,556,654

UNITED STATES PATENT OFFICE.

HENRY H. WHITE, OF MUSKOGEE, OKLAHOMA, ASSIGNOR OF FORTY-NINE ONE-HUN-DREDTHS TO OKLAHOMA ENGINEERING & FOUNDRY CO.

POWER DELIVERING OR HOISTING WINCH.

Application filed November 1, 1923. Serial No. 672,072.

*To all whom it may concern:*

Be it known that I, HENRY H. WHITE, a citizen of the United States, residing at Muskogee, in the county of Muskogee and State of Oklahoma, have invented certain new and useful Improvements in Power Delivering or Hoisting Winches, of which the following is a specification.

This invention relates to power delivering or hoisting winches which are built into a well known tractor and forming a component part thereof.

The object of my invention is to provide a portable contractor's hoist having two drums, one on either side thereof, which are driven from the axles of the tractor by means of gear-wheels keyed thereto, which gears mesh with pinions secured to a jack-shaft, the latter being held in position on the rear of the tractor by means of specially designed housings, and has pinions secured to the outer ends thereof, which pinions mesh with gears secured to the inside of each drum.

A further object of my invention is to provide a hoist on which the drums are driven by separated sectional axle shafts and may be used together or separately.

A further object of my invention is the cutting in two of each axle shaft, so that the wheels which are mounted on the outer members thereof may be at rest when the tractor is operating, and driving one, or both, cable drums.

A further object of my invention is the utilization of the inside of each cable drum for an expanding brake band, which is operated by a foot brake on one of the drums and hand brake on the other, one of which may be used when both drums are in gear as an auxiliary foot brake and the other as an emergency brake.

A further object of my invention is the provision of free release drums spinning on the axle housings, which is made possible by means of hand or foot expanding brakes internally arranged in each drum holding the load, and the disengaging of one, or both, drums by sliding the pinions on the jack shaft inwardly, out of gear with the external gears secured to the internal part of each drum.

The invention further relates to the manner in which the pinion and gearing are assembled in the specially designed axle and gear housing so that the power delivery to the axle shafts is increased but in the same ratio as the tractor, namely, that the axle shafts can be operated in low, intermediate, high and reverse, thereby securing the same ratio as that of the tractor, and that in so operating, it does not in any way interfere with, or injure the mechanism of the tractor.

The invention further provides, and relates to the manner in which the pinions and gears are built into the tractor so that the power delivering assembly may function at all times without in any way interfering with the usefulness for which the tractor was designed, and without the necessary substitution and equipment of especially designed wheels.

In the drawings:

Fig. 4 is a transverse section on the line 4—4 of Fig. 2.

Figure 1:
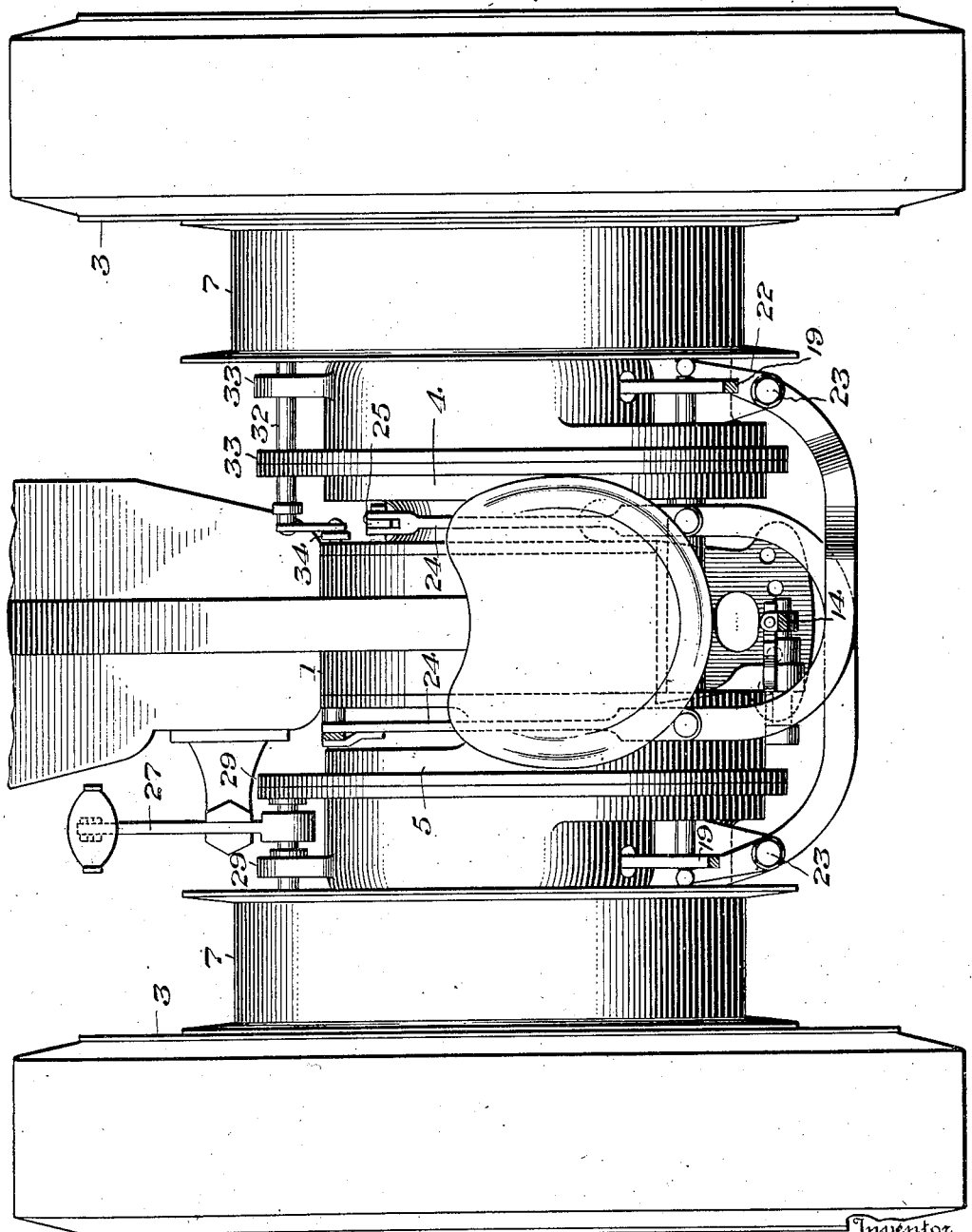
Fig. 1 is a top plan view of the rear portion of the tractor showing the improved features.
Figure 2:
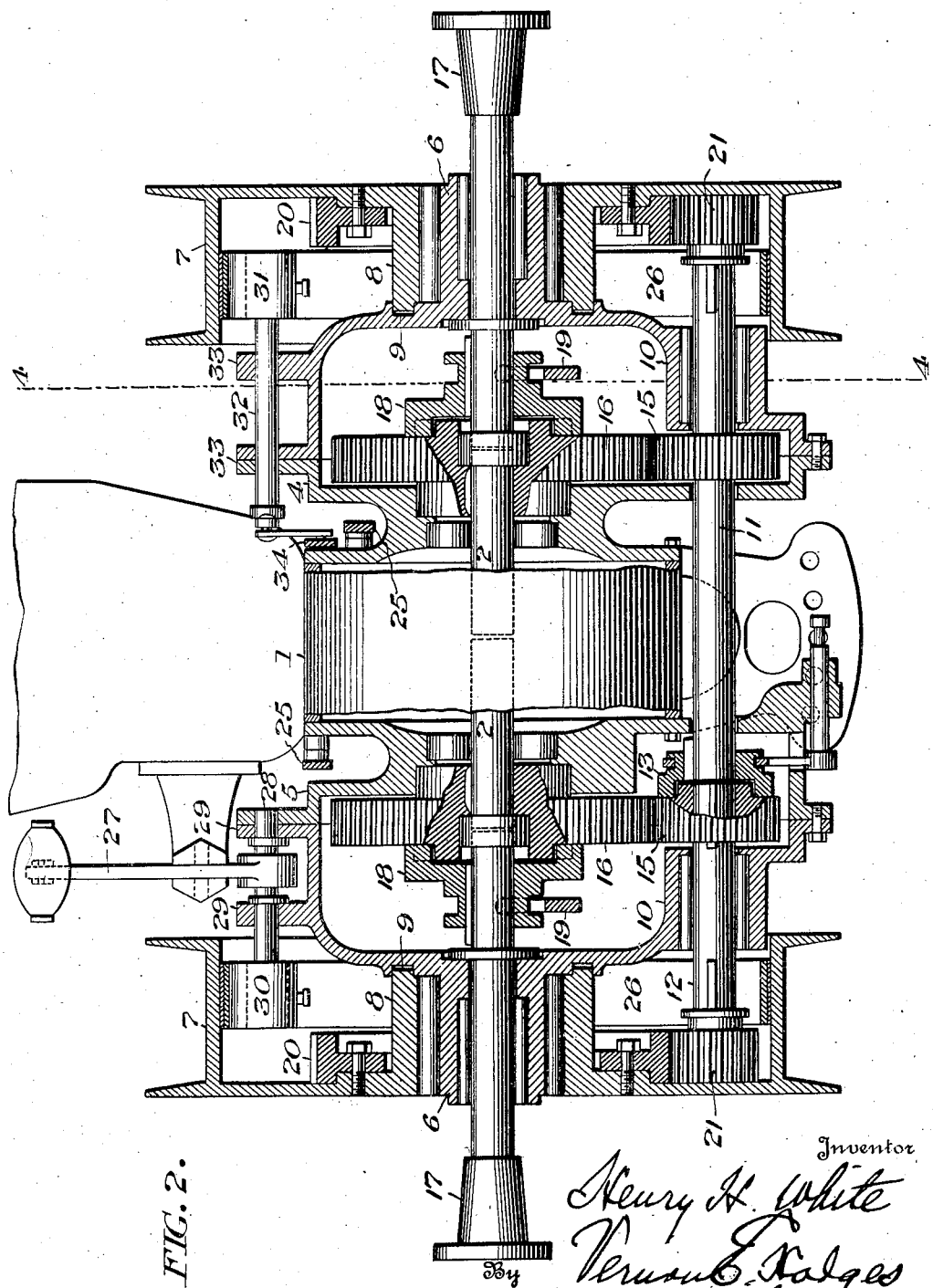
Fig. 2 is a horizontal longitudinal section through the axle housings.
Figure 3:
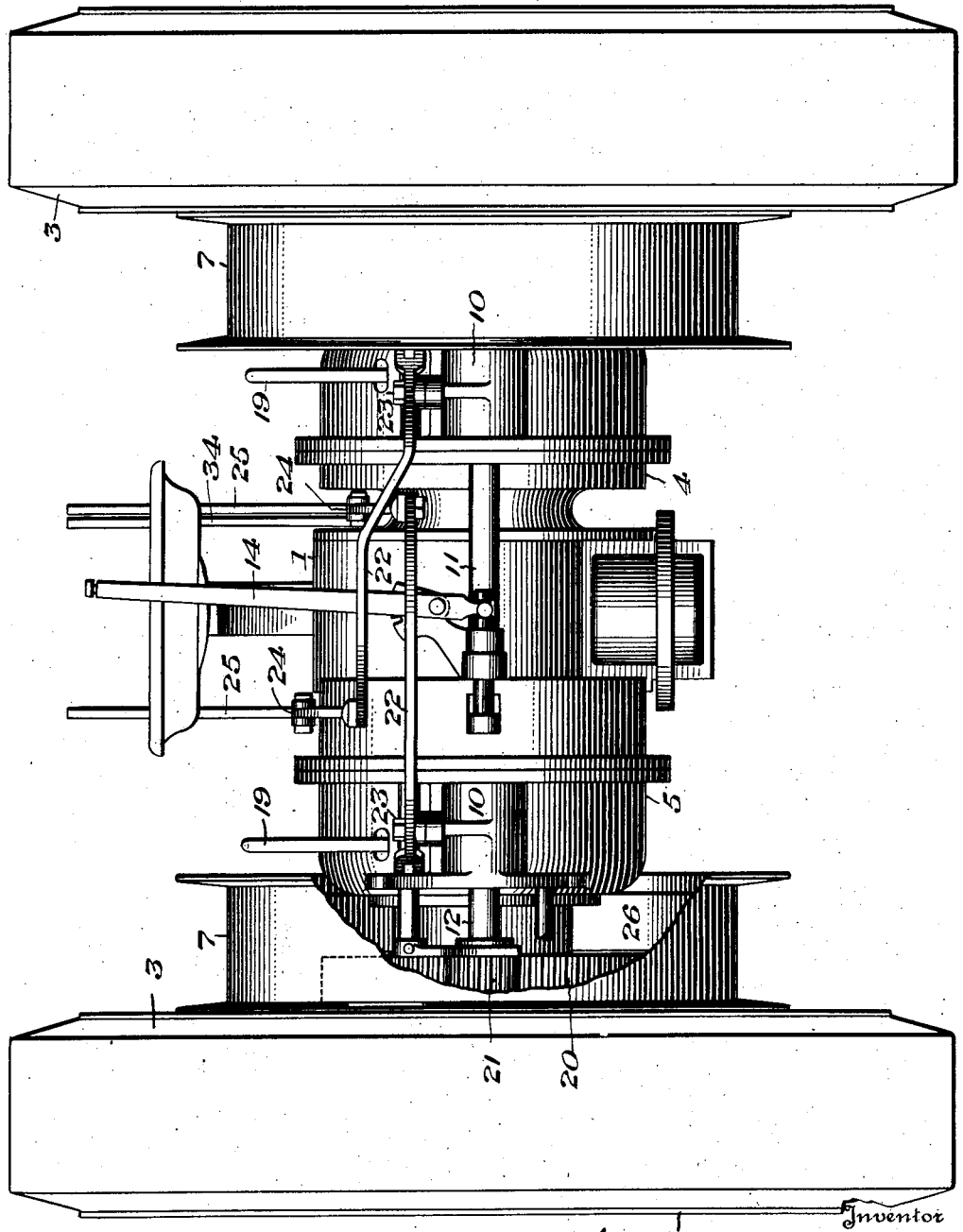
Fig. 3 is a rear elevation.

Numeral 1 indicates the differential housing enclosing the differential drive shaft and gearing for driving the rear axles 2—2 and the rear tractor wheels 3—3. Secured to either side of the differential housing are the axle housings 4 and 5 which are flanged and secured to the differential housing. Extending outwardly from the ends of each housing is a bearing 6 which supports the outer ends of the axles 2—2. These bearings 6 also form a bearing for the cable drums 7—7, the hubs 8—8 of which surround the bearings 6, the inner ends of the hubs being received in annular grooves 9 in the face of the axle housings 4 and 5.

Arranged at the rear of the machine and supported in suitable bearings 10—10 carried by the housings 4 and 5 is a jack shaft consisting of two members 11 and 12, said members being connected together by a clutch 13, the latter being actuated by a clutch lever 14. Each member 11 and 12 is provided with a pinion 15, the pinions 15—15 mesh with comparatively large pinions 16—16 keyed to the rear axles 2—2. As observed, each of the main drive axles is sectional forming outer members 17—17 to which the tractor wheels are secured. The sections 2 and 17 on each side of the differential housing are connected together by suitable detail clutches 18—18 controlled by clutch levers 19—19. This construction is desirable in that it permits the tractor wheels to be disconnected from the driving axles and permitting the jack shaft to be driven by the gears 16—16 which are keyed to the inner stubs of the main drive axles.

Each of the cable drums 7—7 has secured thereto a comparatively large gear 20 secured to the flange of the hub 8. These large gears mesh with pinions 21—21 slidably keyed to the outer ends of the jack shafts 11 and 12. Each of these pinions is connected to a shift lever 22, the latter being pivoted as at 23 to a bracket extending from the corresponding bearing 10. The outer free ends of the shift levers 22—22 are connected by links 24—24 to actuating levers 25—25 accessible from the operator's seat whereby either pinion may be disengaged from the drum, permitting either drum to idle if desirable upon its bearing. As a means for controlling the drums, each is provided with an internal expanding brake drum 26, one of which is controlled by a foot lever 27 pivoted upon the rock shaft 28 supported in suitable lugs or bearings 29—29 extending outwardly from the axle housing. On the outer end of the rock shaft 28 is a brake expander 30 which engages the expanding band 26. The opposite brake band 26 is likewise controlled by a brake expander 31 keyed to the rock shaft 32 supported in suitable lugs or bearings 33 extending outwardly from the opposite housing, this rock shaft 32 being controlled by a hand lever 34.

The object in providing both a foot lever and a hand brake lever for operating the separate brake bands is to permit both drums being controlled by the one foot lever when the jack shafts 11 and 12 are clutched together and working in unison. It is obvious that the brake lever would work in the same capacity under these conditions, but the foot lever is considered more dependable.

It will thus be seen that I have provided as an attachment for a well known tractor hoisting drums which derive their power from the main drive axles of the tractor and have provided means whereby the tractor wheels may be disconnected from the main drive axles when the tractor is at rest. This construction permits the use of the different speeds in the transmission of the differential drive shaft being used in connection with the drums as well when they are in operation, this arrangement giving greater latitude in applying different ratios of power to the drums.

The hollow axle housings are so constructed that the jack shaft driving mechanism is entirely enclosed within the axle housings, thereby eliminating any possible danger to the operator were the gearings exposed.

It is obvious that more or less slight changes might be made in the construction without departing from the general scope of the invention, therefore I do not wish to be limited to the exact structure shown.

I claim:

1. A power delivering attachment for motor vehicles including a drive axle having outer and inner sections, axle housings, a drum rotatably mounted on one of the housings, and means for connecting the drum to a section of the drive axle for rotating said drum.

2. A power delivering attachment for motor vehicles consisting of sectional main drive axles, hollow flanged axle housings, rotatable drums journaled on said housings, a jack shaft geared to said rotatable drums, and driving means connecting one of the sectional axles to said jack shaft.

3. A power delivering attachment for motor vehicles consisting of a sectional main drive axle, hollow flanged axle housings, rotatable drums journaled on said housings, a sectional jack shaft, the outer ends of which are geared to the respective drums, independent driving means connecting each of the jack shaft members to the sectional main drive axle.

4. A power delivering attachment for motor vehicles comprising sectional main drive axles, clutches connecting the parts of said sectional members together, tractor wheels keyed to the outer ends of said sectional drive axles, axle housings provided with bearings to support the respective sections of the drive axles, rotatable drums journaled upon said housings concentrically with said sectional drive axles, a jack shaft carried by said housing, driving means connecting said jack shaft with one of the main drive axles, slidable pinions carried upon the outer ends of said jack shaft adapted to mesh with gears carried by said drums, and means for independently disengaging either of said pinions from the drum gears.

5. A power delivering attachment for motor vehicles comprising sectional main drive shafts, clutches connecting the parts of said sectional members together, tractor wheels keyed to the outer end of said sectional drive shafts, axle housings provided with bearings to support the respective sections of the drive shafts, rotatable drums journaled upon said housings concentrically with said sectional drive axles, a jack shaft consisting of two members carried by said housings, a clutch connecting said members together, driving means arranged between the said jack shaft members and the inner sections of said drive shafts and pinions slidably keyed to the outer ends of said sectional jack shaft adapted to drive said drums, and means for independently disengaging either of said pinions from the drum.

6. A power delivering attachment for motor vehicles comprising sectional main drive shafts, clutches connecting the parts of said sectional members together, tractor wheels keyed to the outer ends of said sectional drive shafts, axle housings provided with bearings to support the respective sections of the drive shafts, rotatable drums journaled upon said housings concentrically with said sectional drive shafts, a jack shaft consisting of two members carried by said housing, a clutch connecting said members together, driving means arranged between the said jack shaft members and the inner sections of said drive shafts and pinions slidably keyed to the outer ends of said sectional jack shaft adapted to drive said drums, means for independently disengaging either of said pinions from the drum, expanding brake bands arranged on the inner surface of said drums, and means for independently actuating said brake bands.

7. A power delivering attachment for motor vehicles including a drive axle having outer and inner sections, axle housings, a rotatable drum journaled on one of said housings, and means connecting the drum to a section of the drive axle for rotating said drum.

8. A power delivering attachment for motor vehicles comprising a drive axle, axle housings, a rotatable drum journaled on each of the axle housings, and means for rotating the drums from the drive axle.

9. A power delivering attachment for motor vehicles comprising a main drive axle, axle housings, rotatable drums journaled thereon, a jack-shaft journaled in bearings of the axle housings for rotating the drums, and driving means connecting the jack-shaft with the main drive axle.

10. A power delivering attachment for motor vehicles comprising sectional drive axles, axle housings, rotatable drums journaled thereon, a jack-shaft connected with the drums, means for connecting the inner sections of the axles to the jack-shaft for driving the same.

11. A power delivering attachment for motor vehicles including drive axles, comprising outer and inner sections, means for connecting and disconnecting the sections of the axles, rotatable drums, and means connected with the axles for rotating the drums.

12. A power delivering attachment for motor vehicles comprising drive axles, axle housings, drums rotatably mounted thereon, a sectional jack-shaft rotatably connected with the axles and drum for rotating the drums, and means for connecting and disconnecting the sections of the jack-shaft.

13. A power delivering attachment for motor vehicles including drive axles, each of said axles comprising outer and inner sections, a clutch for connecting and disconnecting the sections of each axle, rotatable drums, and means connected with the drive axles for rotating said drums.

14. A power delivering attachment for motor vehicles including a drive axle, axle housings, a rotatable drum journaled on one of said housings, a jack-shaft for rotating the drum, and means connecting the drive axle to the jack-shaft for driving the same.

15. A power delivering attachment for motor vehicles including drive axles, axle housings, rotatable drums journaled on said housings, a jack-shaft for rotating the drums, the inner surface of each of the drums constituting a brake drum, an expanding brake band within each of the drums for engaging said inner surface, and means for actuating the brake bands.

16. A power delivering attachment for motor vehicles including drive axles, axle housings, rotatable drums journaled on said housings, a jack-shaft for rotating the drums, means connecting the drive axles to the jack-shaft for driving the same, the inner surfaces of the drums constituting brake drums, an expanding brake band within each of the drums for engaging said inner surface and controlling the drums, and levers for actuating the brake bands.

17. A power delivering attachment for motor vehicles including differential gearing, wheels, drive axles connected with the gearing for driving the wheels, each of said drive axles being transversely split into sections, and means for connecting said sections together.

18. A power delivering attachment for motor vehicles including differential gearing, traction wheels, drive axles connected with the gearing for driving the wheels, each of said drive axles being transversely split into sections, rotatable drums connected with and driven by certain of the sections, and means for connecting and disconnecting the sections for driving either of the drums independent of the wheels.

19. A power delivering attachment for motor vehicles including differential gearing, traction wheels, drive axles, connected with the gearing for driving the wheels, each of said drive axles being transversely split into sections, rotatable drums geared to and driven by the inner sections, and clutches for connecting and disconnecting the sections of the axles for driving either of the drums independent of the wheels.

In testimony whereof I affix my signature.

HENRY H. WHITE.